United States Patent
Kinoshita (10) Patent No.: US 9,449,251 B2
(45) Date of Patent: Sep. 20, 2016

(54) IMAGE PROCESSING APPARATUS, IMAGE PROCESSING METHOD, AND MEDIUM

(71) Applicant: CANON KABUSHIKI KAISHA, Tokyo (JP)

(72) Inventor: Hideyuki Kinoshita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/721,116

(22) Filed: May 26, 2015

(65) Prior Publication Data

US 2015/0347865 A1 Dec. 3, 2015

(30) Foreign Application Priority Data

May 28, 2014 (JP) ................................ 2014-110485

(51) Int. Cl.
G06K 9/34 (2006.01)
G06K 9/46 (2006.01)
H04N 1/46 (2006.01)

(52) U.S. Cl.
CPC .............. *G06K 9/4652* (2013.01); *H04N 1/46* (2013.01)

(58) Field of Classification Search
USPC ........ 382/164, 162, 167; 345/419, 590, 602; 347/19, 257, E27.251; 348/222.1, 348/223.1, 224.1, 225.1, E9.04, E9.052, 348/349, 364, 649, 652; 358/1.9, 296, 504, 358/518; 399/49
See application file for complete search history.

(56) References Cited

U.S. PATENT DOCUMENTS

| | | | | |
|---|---|---|---|---|
| 5,420,630 A | * | 5/1995 | Takei | ...................... H04N 9/735 348/223.1 |
| 5,539,523 A | * | 7/1996 | Nakai | ...................... H04N 1/622 358/296 |
| 5,831,672 A | * | 11/1998 | Takei | ...................... H04N 9/735 348/224.1 |
| 7,999,822 B2 | | 8/2011 | Ishii | |
| 8,223,410 B2 | * | 7/2012 | Wakazono | ............. H04N 9/735 345/419 |
| 8,964,246 B2 | * | 2/2015 | Sakatani | ............ G03G 15/0131 345/590 |

FOREIGN PATENT DOCUMENTS

JP 2008278054 A 11/2008

\* cited by examiner

*Primary Examiner* — Anh Do
(74) *Attorney, Agent, or Firm* — Rossi, Kimms & McDowell LLP (57) ABSTRACT

An image processing apparatus that extracts colors of patches from a photographed image data of a chart image is provided. The image processing apparatus includes: a position extraction unit configured to extract information indicating a position of the chart image in the photographed image data; an acquisition unit configured to acquire information indicating a patch position of each patch images in the chart image based on the chart image; a setting unit configured to set an extraction range in accordance with the patch position of each of the patch images in the photographed image data based on the information; a determination unit configured to determine whether or not the set extraction range fits inside each of the patch images; and a color extraction unit configured to extract a color of each patch image.

9 Claims, 14 Drawing Sheets

Error message

Patch information cannot be acquired correctly.
Photograph output chart again.

| Patch No | R | G | B |
|---|---|---|---|
| patch 1 | XXX | XXX | XXX |
| patch 2 | XXX | XXX | XXX |
| patch 3 | XXX | XXX | XXX |
| patch 4 | XXX | XXX | XXX |
| patch N | XXX | XXX | XXX |

IMAGE PROCESSING APPARATUS, IMAGE PROCESSING METHOD, AND MEDIUM

BACKGROUND OF THE INVENTION

1. Field of the Invention

The present invention relates to an image processing apparatus, an image processing method, and a medium for extracting characteristics of an object to be measured included in a photographed image.

2. Description of the Related Art

In the case where color reproduction characteristics of a device are measured, there is a method of performing measurement by displaying or outputting a patch for each color one by one by using the device. For example, there is a method of sequentially measuring images based on RGB data (729 (=9×9×9) colors in total) obtained by slicing the ranges of R, G, and B between 0 and 255 (0≤R, G, B≤255) into nine ranges, respectively, as patches. However, this method requires a number of measurement processes because measurement is performed for each color, and as a result, requires a long time in order to measure the color reproduction characteristics of one device.

Further, there is a method of displaying or outputting charts including all the color reproduction ranges of a device and measuring the charts at a time by using a two-dimensional measuring instrument such as a digital camera. Furthermore, a method of automatically measuring charts has been proposed. Japanese Patent Laid-Open No. 2008-278054 has proposed a method of extracting a chart area by analyzing color information along a plurality of directions perpendicular to one another in an image acquired by measuring a chart including an already-known background color using a two-dimensional measuring instrument.

Japanese Patent Laid-Open No. 2008-278054 premises that the patches included in the chart image acquired by using a two-dimensional measuring instrument are arranged along two directions perpendicular to each other. Because of this, the case where it is possible to accurately detect the chart area is limited to the case where the chart image can be acquired by using a two-dimensional measuring instrument in a position substantially facing the chart.

In the case where the two-dimensional measuring instrument does not face the chart perfectly, a distortion occurs in the chart in the image acquired by measurement. In the case where the extraction range of the patch is set uniquely in the chart having a distortion, there is a possibility that the extraction range will not fit inside the patch. In this case, it is not possible to extract the characteristics of the patch with accuracy, and as a result, there occurs such a problem that it is not possible to acquire the color characteristics of a device with high accuracy.

SUMMARY OF THE INVENTION

Because of this, in view of the above-described point, an object of the present invention is to provide an image processing apparatus capable of accurately acquiring patch information on each patch from a chart photographed image including a chart image having a distortion.

The present invention is an image processing apparatus that extracts colors of patches from a photographed image data of a chart image, the image processing apparatus comprising: a position extraction unit configured to extract information indicating a position of the chart image in the photographed image data; an acquisition unit configured to acquire information indicating a patch position of each patch images in the chart image based on the chart image; a setting unit configured to set an extraction range in accordance with the patch position of each of the patch images in the photographed image data based on the information; a determination unit configured to determine whether or not the set extraction range fits inside each of the patch images; and a color extraction unit configured to extract a color of each patch image based on pixel values of pixels included in the extraction range in a case where the determination unit determines that the extraction range fits inside each of the patch images for all the patch images.

Further features of the present invention will become apparent from the following description of exemplary embodiments (with reference to the attached drawings).

DESCRIPTION OF THE EMBODIMENTS

Hereinafter, with reference to the attached drawings, the present invention is explained in detail based on preferred embodiments. Configurations shown in the following embodiments are just illustrative and the present invention is not limited to the configurations shown schematically.

First Embodiment

About Configuration of Image Processing Apparatus

Figure 1:
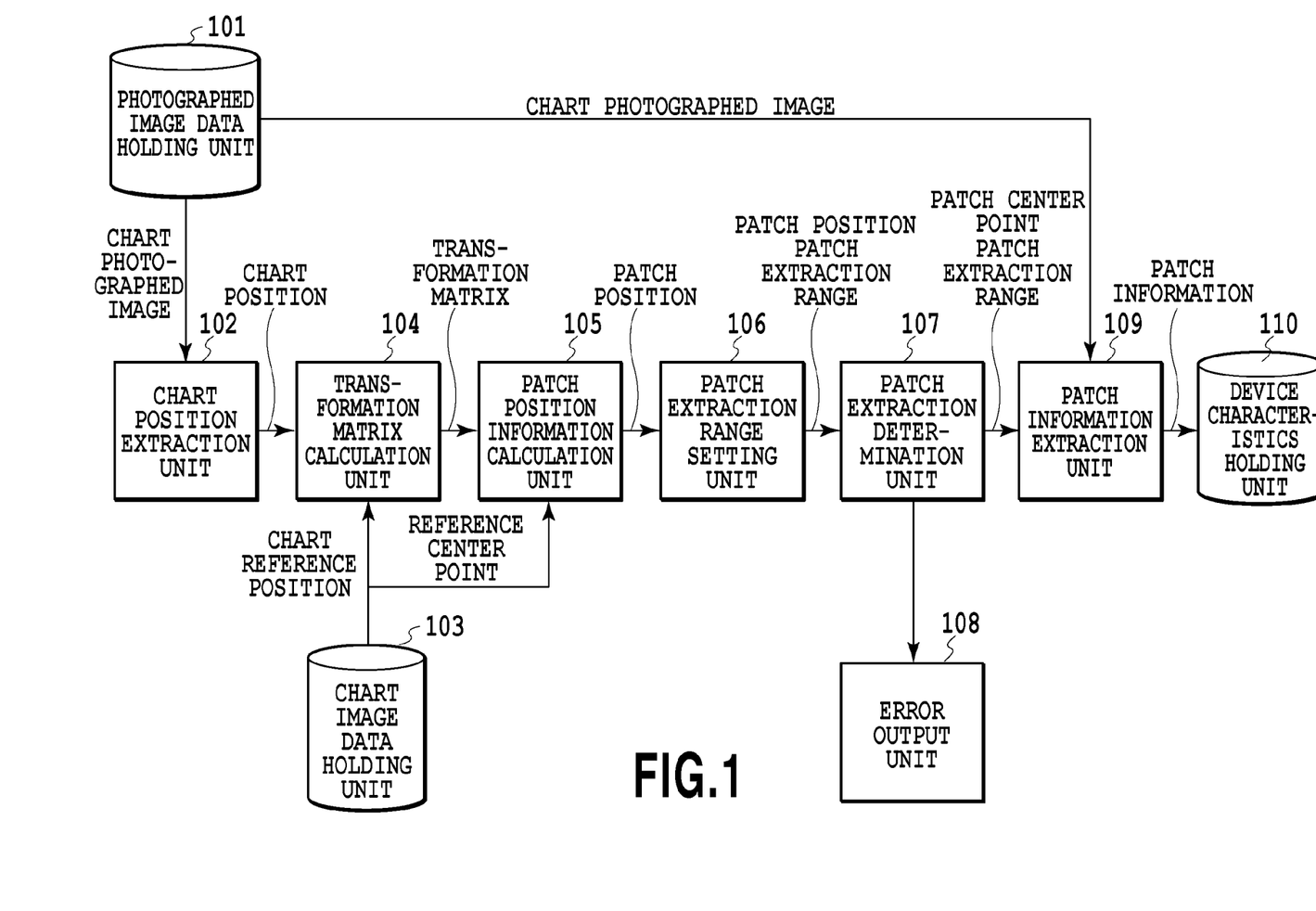
FIG. 1 is a block diagram showing a configuration of an image processing apparatus in a first embodiment.

FIG. 1 is a block diagram showing a function configuration of an image processing apparatus in the present embodiment. In FIG. 1, a photographed image data holding unit 101 is a database that holds chart photographed images. A chart position extraction unit 102 extracts information indicative of the position of a chart in the chart photographed image. A chart image data holding unit 103 is a database that holds chart images. A transformation matrix calculation unit 104 calculates a transformation matrix for transforming the coordinates of a chart image into the coordinates of a chart photographed image. A patch position information calculation unit 105 calculates information indicative of the position of each patch in the chart photographed image. A patch extraction range setting unit 106 sets a patch extraction range for each patch in the chart photographed image. A patch extraction determination unit 107 determines whether or not a patch extraction range set for each patch in the chart photographed image fits inside the patch. An error output unit 108 displays an error message. A patch information extraction unit 109 extracts patch information from the chart photographed image. A device characteristics holding unit 110 is a database that stores patch information extracted from the chart photographed image as characteristics inherent in the device.

Figure 2A:
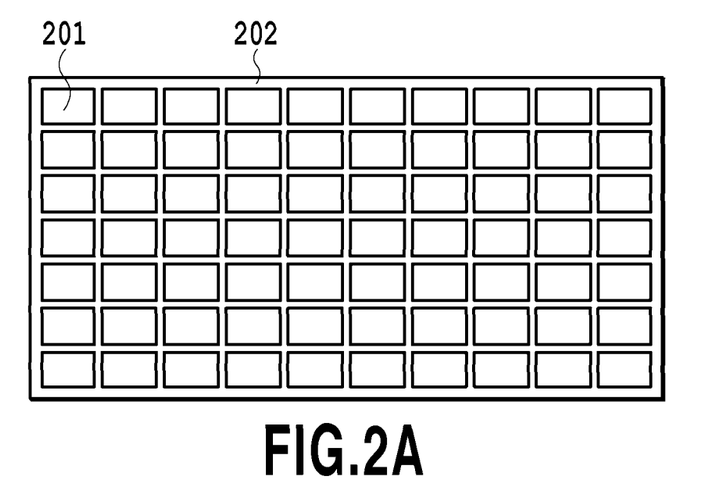
FIG. 2A is a diagram showing an example of a chart image in the first embodiment.
Figure 2B:
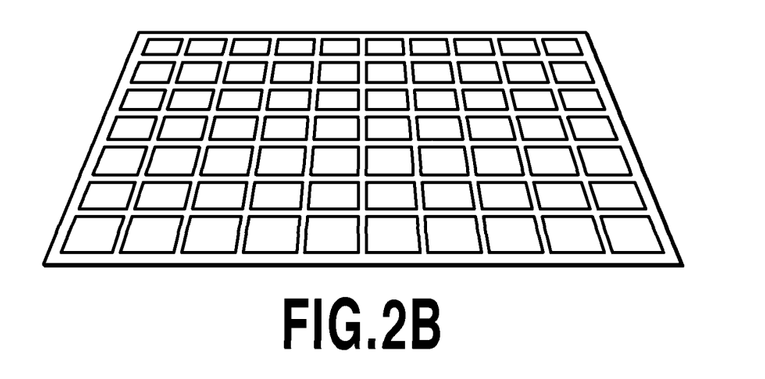
FIG. 2B is a diagram showing an example of a chart photographed image in the first embodiment.

The chart image in the present specification means original image data (electronic data) of a chart 202 in which rectangular patches 201 are arranged in regular order as shown in FIG. 2A. The chart photographed image in the present specification is image data acquired by photographing a chart image output by or displayed on a device, which is the object of evaluation, by using a two-dimensional measuring instrument, such as a scanner and a digital camera. An example of the chart photographed image acquired by performing photographing using a digital camera is shown in FIG. 2B. In the case where photographing is performed in the state where the output chart, which is to be photographed, and the digital camera with which photographing is performed are not facing each other perfectly, the shape of the chart and the shape of the patch in the chart photographed image are not rectangular and the shape is distorted and becomes close to a trapezoid as shown in FIG. 2B.

(About Processing Performed by Image Processing Apparatus)

In the present embodiment, a chart photographed image acquired by performing photographing using a digital camera is prepared in advance and held in the photographed image data holding unit 101, and patch information on each patch included in the chart in the chart photographed image is extracted. Further, as patch information on each patch, RGB values of each patch are extracted.

In the present embodiment, first, the position information on the chart is extracted from the chart photographed image and then the position information on each patch included in the chart is calculated. Next, the patch extraction range is set for the patch. In the case where the set patch extraction range fits inside each patch, the RGB values of pixels existing in an area included in the patch extraction range are extracted as patch information. Finally, the patch information that has been extracted for all the patches is saved as device characteristics inherent in the device that has output or displayed the chart. In the case where the set patch extraction range does not fit inside the patch, an error message is output.

Figure 3:
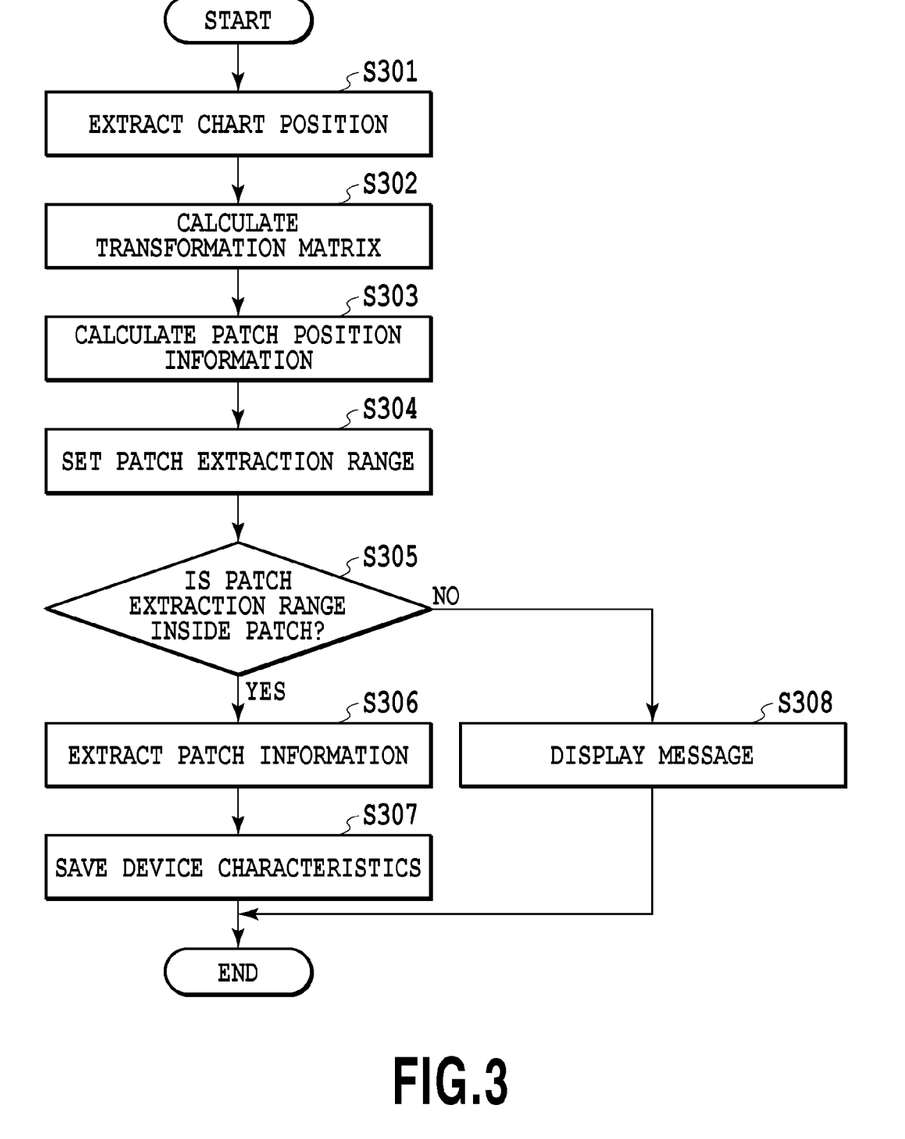
FIG. 3 is a flowchart showing a flow of processing of the first embodiment.

The processing performed by the image processing apparatus shown in FIG. 1 is explained in detail by using the flowchart in FIG. 3.

Figure 4A:
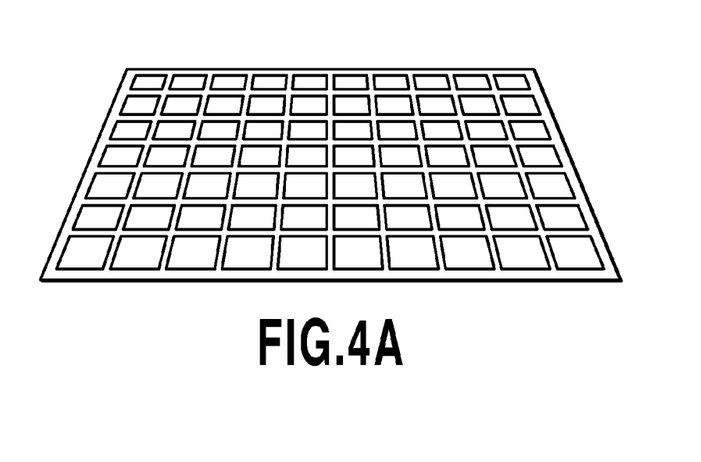
FIGS. 4A and 4B are diagrams explaining an example of a method of extracting four vertexes of the chart photographed image.
Figure 4B:
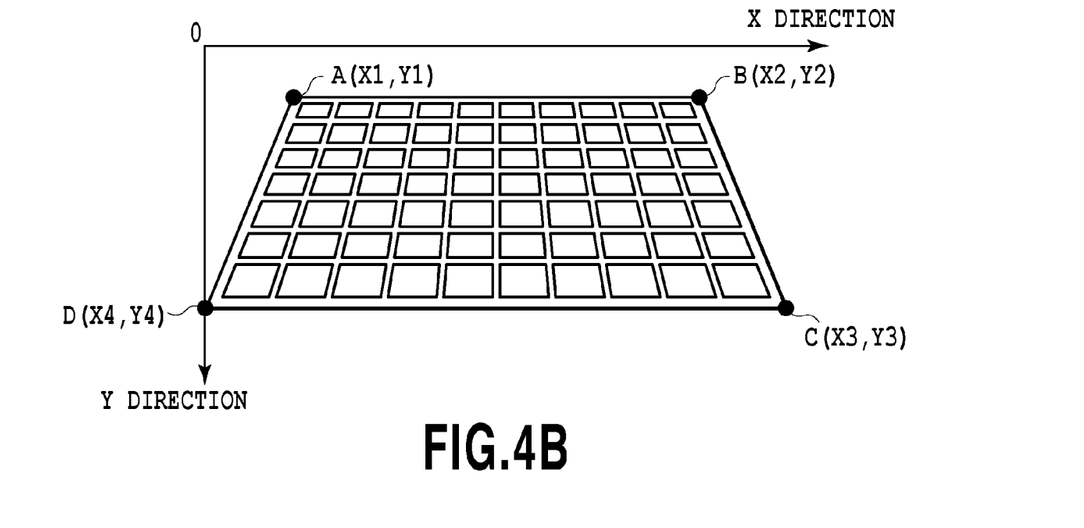

At step S301 (hereinafter, step S301 is abbreviated to "S301" and this also applies to the other steps), the chart position extraction unit 102 reads a chart photographed image from the photographed image data holding unit 101 and extracts the position information on the chart in the chart photographed image. Specifically, the chart position extraction unit 102 extracts the coordinates of the four vertexes of the chart in the chart photographed image as the position information on the chart. For example, in the case where the chart photographed image is an image shown in FIG. 4A, the chart position extraction unit 102 extracts the coordinates of the four vertexes of the chart as the position information on the chart, on the assumption that a point distant from the top-left of the chart photographed image is defined as the origin and an x-direction and a y-direction are determined as shown in FIG. 4B. Here, in the case where the top-left vertex, the top-right vertex, the bottom-right vertex, and the bottom-left vertex of the chart are taken to be A, B, C, and D in order, it is assumed that the coordinates of the four vertexes are (X1, Y1), (X2, Y2), (X3, Y3), and (X4, Y4), respectively, as shown in FIG. 4B. As a method of extracting the four vertexes of the chart, for example, it is sufficient to display the chart photographed image on a display unit, such as a monitor, and to extract the four vertexes via instructions of a user via a user interface (UI).

At S302, the transformation matrix calculation unit 104 calculates a transformation matrix H for transforming coordinates in the chart image into coordinates of the corresponding position in the chart photographed image. The transformation matrix H is calculated by using the positions of the four vertexes in the chart image and the positions of the four vertexes in the chart photographed image.

Figure 5A:
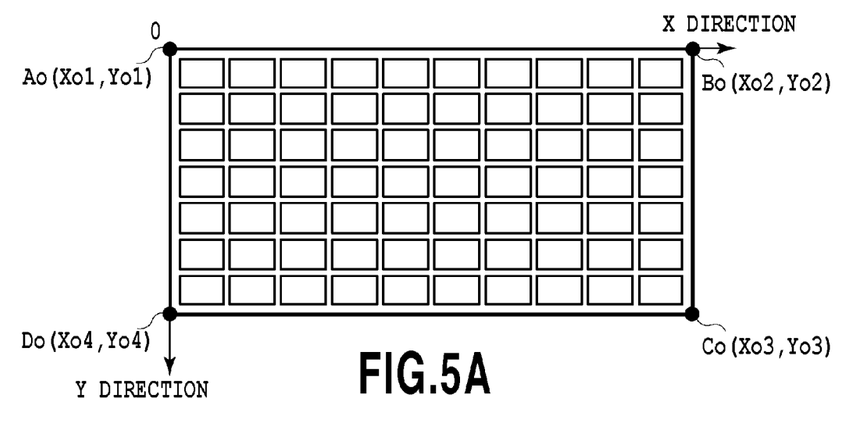
FIG. 5A is a diagram showing four vertexes in the chart image that are used for calculation of a transformation matrix H.
Figure 5B:
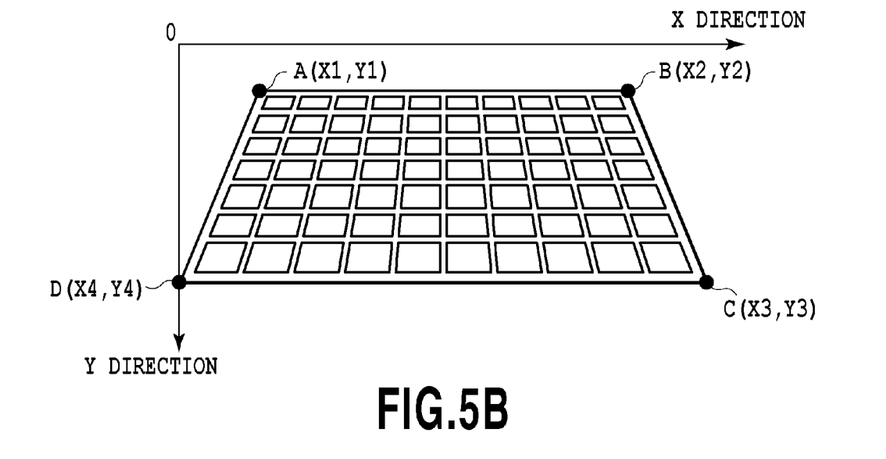
FIG. 5B is a diagram showing the four vertexes in the chart photographed image that are used for the calculation of the transformation matrix H.

A method of calculating the transformation matrix H is explained. First, the coordinates of the four vertexes of the chart image are extracted as chart reference positions. Specifically, as in the case of the coordinates set for the chart photographed image at S301, an xy-coordinate system with the top-left of the image being taken to be the origin is set also for the chart image as shown in FIG. 5A and the coordinates of the four vertexes of the chart are extracted as chart reference positions. Here, in the case where the top-left vertex, the top-right vertex, the bottom-right vertex, and the bottom-left vertex of the chart are taken to be Ao, Bo, Co, and Do in order, it is assumed that the coordinates of the four vertexes are (Xo1, Yo1), (Xo2, Yo2), (Xo3, Yo3), and (Xo4, Yo4), respectively.

The transformation matrix H is calculated by using the coordinates of the four points Ao to Do in the chart image and the coordinates of the four points A to D in the chart photographed image set at S301. Specifically, by solving expression (1) below, it is possible to calculate the transformation matrix H.

$$\begin{bmatrix} X1 & X2 & X3 & X4 \\ Y1 & Y2 & Y3 & Y4 \\ 1 & 1 & 1 & 1 \end{bmatrix} = H \begin{bmatrix} Xo1 & Xo2 & Xo3 & Xo4 \\ Yo1 & Yo2 & Yo3 & Yo4 \\ 1 & 1 & 1 & 1 \end{bmatrix} \quad (1)$$

By using the transformation matrix H that is calculated by the above-described method, it is possible to transform the coordinates of the four points Ao to Do in the chart image into the coordinates of the four points A to D in the chart photographed image. Further, by using the transformation matrix H, it is possible to calculate the coordinates indicating an arbitrary position in the chart photographed image by transforming the coordinates indicating the corresponding position in the chart image.

At S303, the patch position information calculation unit 105 calculates the position information on each patch in the chart photographed image. Here, it is assumed that the center position of an ith patch i (i=1, 2, ..., N) in the chart image is $Po_i$ ($xo_i$, $yo_i$) (i=1, 2, ..., N). It is also assumed that the center position of the ith patch in the chart photographed image is $P_i$ ($x_i$, $y_i$) (i=1, 2, ..., N). In this case, it is possible to calculate the center position $P_i$ ($x_i$, $y_i$) of the patch i in the chart photographed image from expression (2) below by using the transformation matrix H calculated at S302.

$$P_i = H \cdot Po_i \ (i=1,2,\ldots,N) \quad (2)$$

Figure 6:
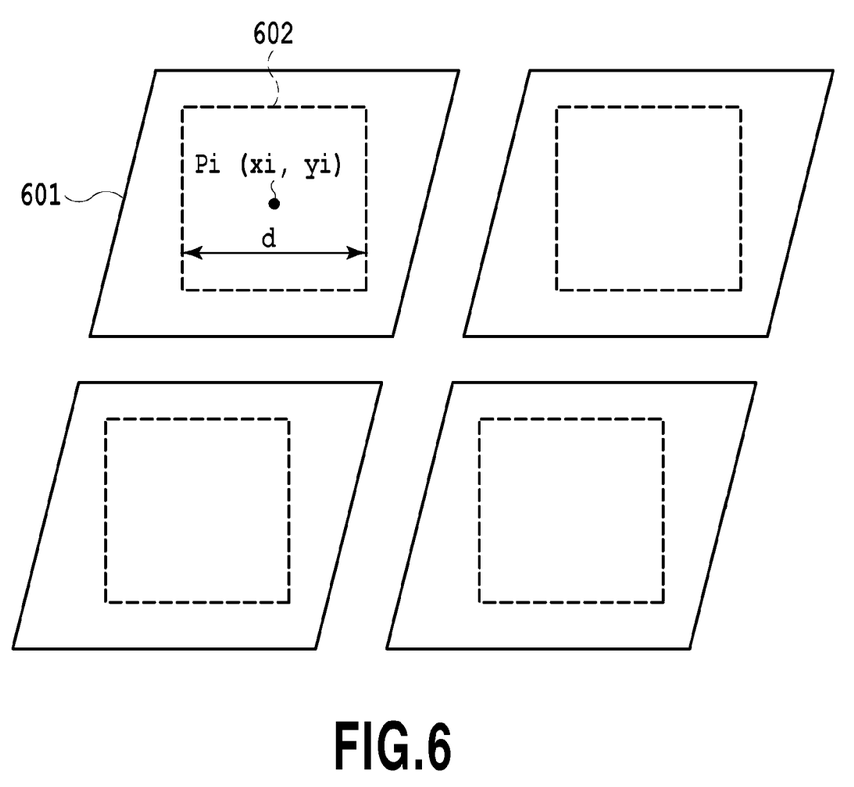
FIG. 6 is a diagram showing an example of a patch extraction range.

At S304, the patch extraction range setting unit 106 sets a patch extraction range for each patch. Specific explanation is given by using FIG. 6. At the coordinates set at S301, a square area whose side has a length d and whose center is located at the center position $P_i$ ($x_i$, $y_i$) of an ith patch 601 is set as a patch extraction range 602.

Figure 7A:
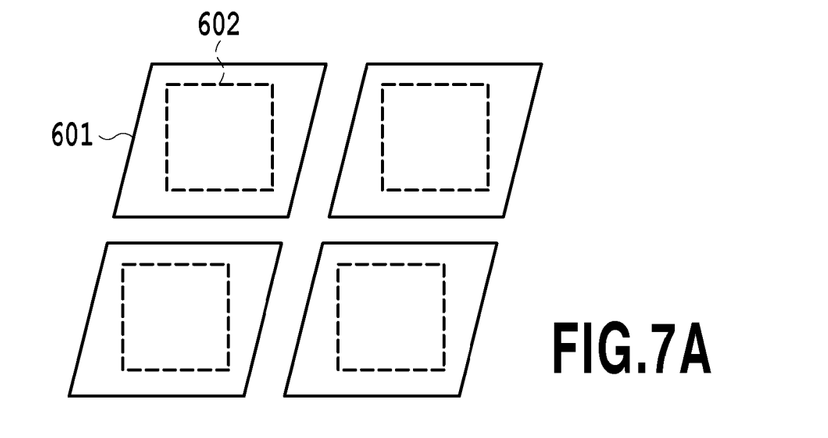
FIGS. 7A, 7B, and 7C are diagrams explaining a setting method of a patch extraction range.
Figure 7B:
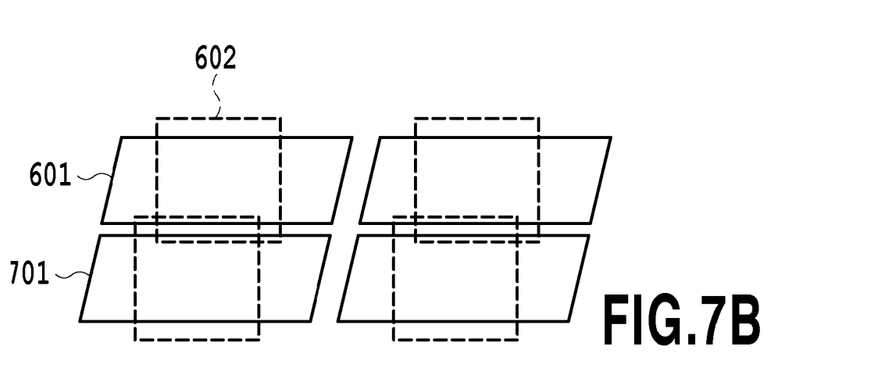

At S305, the patch extraction determination unit 107 determines whether or not the patch extraction range fits inside the patch. As shown in FIG. 7A, in the case where the patch extraction range 602 fits inside the ith patch 601, it is possible to accurately extract patch information on the ith patch 601 to be extracted. However, as shown in FIG. 7B, in the case where the patch extraction range 602 for the ith patch 601 reaches a neighboring patch 701, the patch information on the neighboring patch 701 is also extracted at the time of extracting the patch information on the ith patch 601 to be extracted. Consequently, in this case, it is not possible to accurately extract the patch information on the ith patch 601. Because of this, at this step, it is necessary for the patch extraction determination unit 107 to determine whether or not the patch extraction range fits inside the patch.

Figure 7C:
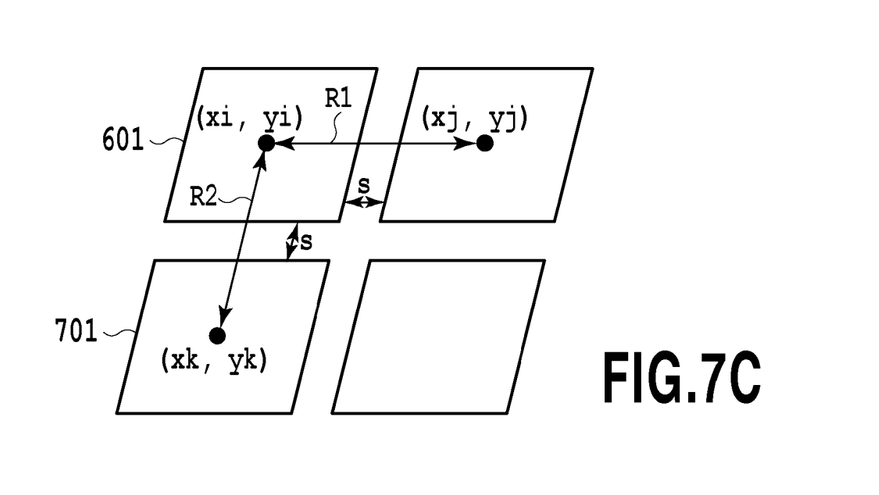

A specific determination method is explained by using FIG. 7C. It is assumed that the center position of the ith patch 601 is $P_i$ ($x_i$, $y_i$), the center position of the patch neighboring the patch 601 in the transverse direction is $P_j$ ($x_j$, $y_j$), and the center position of the patch neighboring the patch 601 in the vertical direction is $P_k$ ($x_k$, $y_k$). In this case, a distance R1 between the patch 601 and the patch neighboring in the transverse direction and a distance R2 between the patch 601 and the patch neighboring in the vertical direction are calculated by using expressions (3) and (4) below.

$$R1 = x_j - x_i \quad (3)$$

$$R2 = y_k - y_i \quad (4)$$

Next, determination using expressions (5) and (6) below is performed for the calculated R1 and R2. Here, s in expressions (5) and (6) is the distance between the patches at the coordinates set at S302.

$$R1 > d + s \quad (5)$$

$$R2 > d + s \quad (6)$$

In the case where both expressions (5) and (6) hold, it is determined that the patch extraction range fits inside the ith patch 601 and the processing proceeds to S306. At least one of expressions (5) and (6) does not hold, it is determined that the patch extraction range 602 set for the ith patch 601 reaches the neighboring patch, and the processing proceeds to S308.

At S306, the patch information extraction unit 109 extracts a pixel value, specifically, RGB values, of each patch from the chart photographed image based on the patch position information calculated by the patch position information calculation unit 105 and the patch extraction range set by the patch extraction range setting unit 106. In the present embodiment, it is assumed that RGB values of each patch are values obtained by averaging R values, G values, and B values, respectively, of the pixels included in the patch extraction range of each patch.

Figure 10:
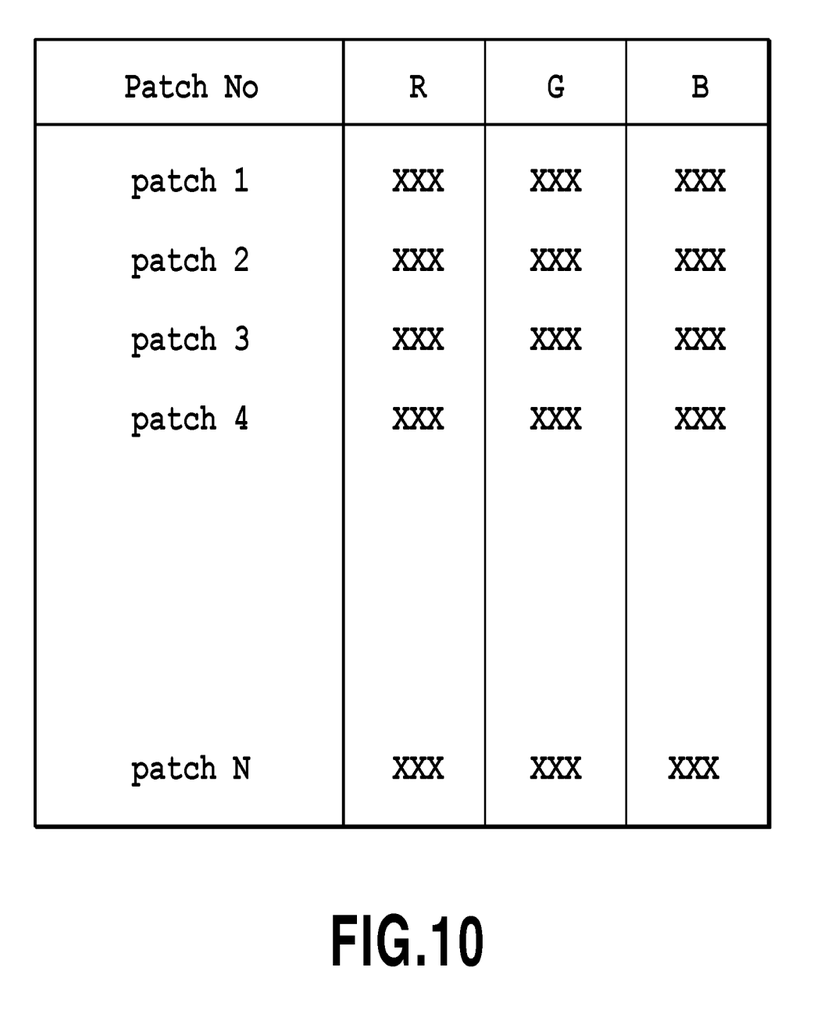
FIG. 10 is a diagram showing an example of device characteristics.

At S307, the device characteristics holding unit 110 saves the patch information extracted by the patch information extraction unit 109 from all the patches as device characteristics inherent in the device. The patch information about all the patches is, for example, a table in which the patch number and the RGB values are associated with each other as shown in FIG. 10.

Figure 8:
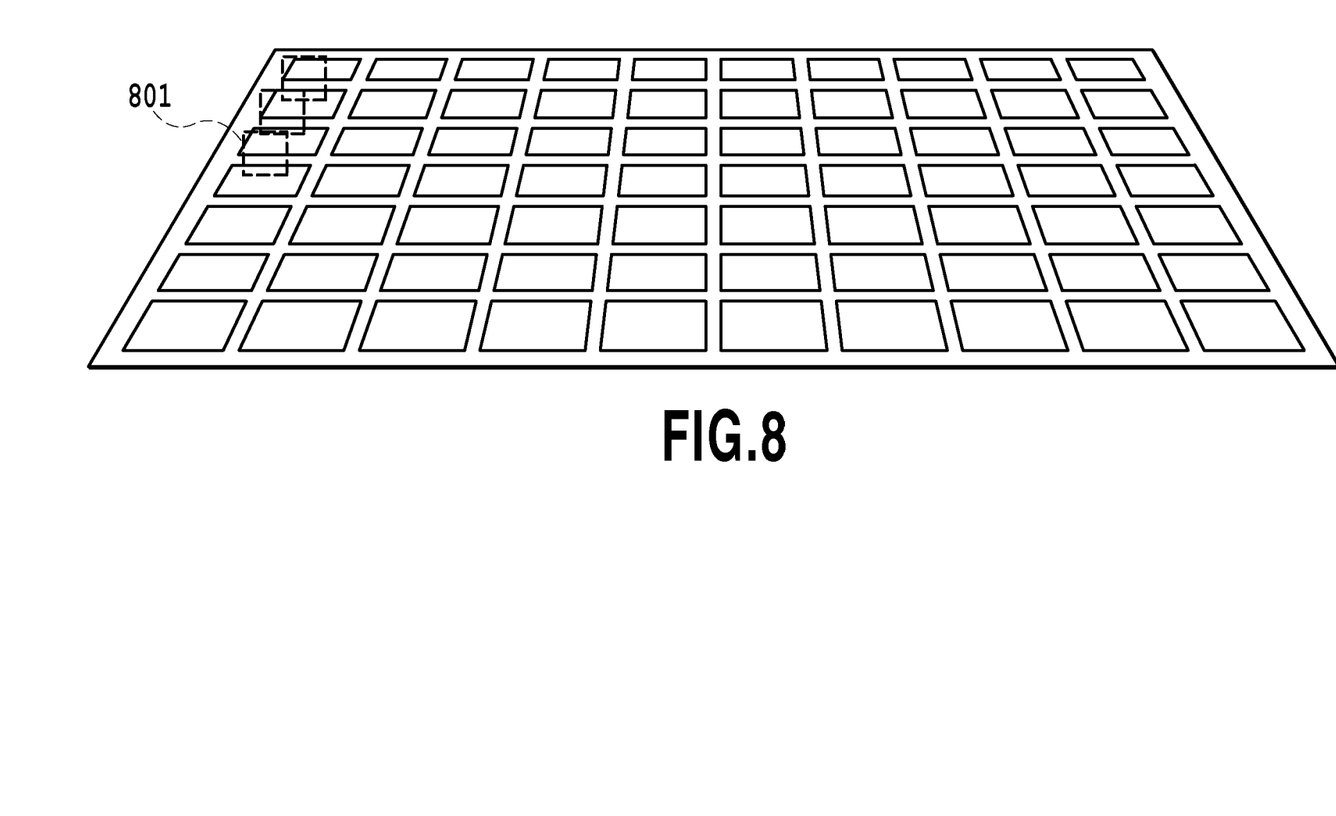
FIG. 8 is a diagram showing an example in which a patch extraction range reaches a neighboring patch.
Figure 9:
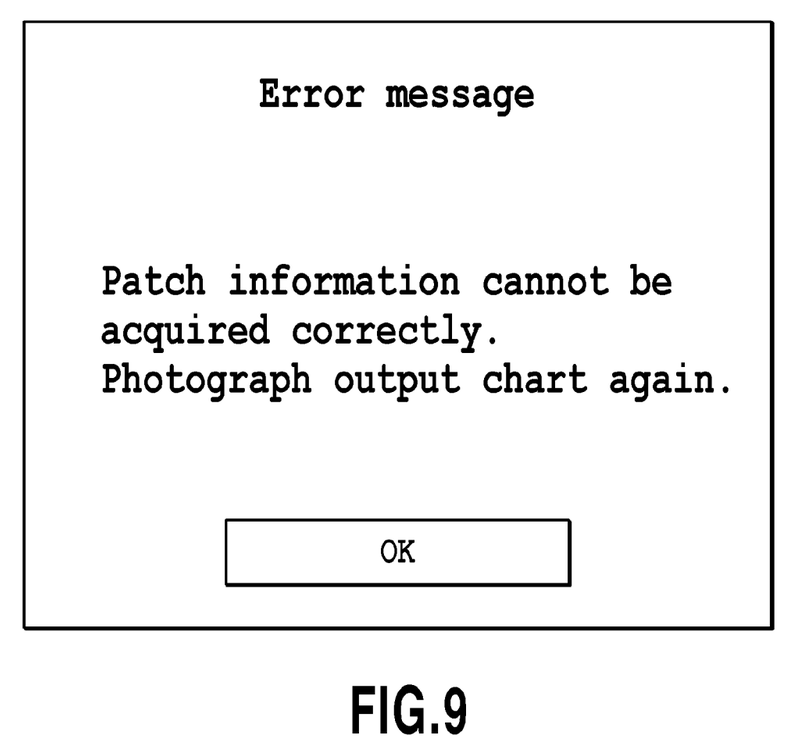
FIG. 9 is a diagram showing an example of an error message.

At S308, the error output unit 108 outputs an error message. For example, in the case where the distortion in the chart shape in the chart photographed image is large as shown in FIG. 8, a patch extraction range 801 of a certain patch reaches the neighboring patch. Consequently, it is not possible to set a patch extraction range inside each patch in the chart photographed image, and therefore, it is not possible to accurately extract the patch information on each patch. Because of this, in the present embodiment, a message as illustrated in FIG. 9 is output to a user to prompt the user to acquire the chart photographed image again. It is sufficient to display this message, for example, on a display device connected to a PC that operates the image processing apparatus according to the present embodiment, or to a PC that functions as the image processing apparatus according to the present embodiment.

As above, in the present embodiment, by using the transformation matrix that is calculated based on the coordinates of the four vertexes of the chart extracted from the chart photographed image, the position information on the patch within the chart photographed image is calculated and the patch extraction range is set for each patch. Then, in the case where the patch extraction range fits inside the patch, the patch information is extracted and the patch information on all the patches is saved as the device characteristics. In other words, due to the present embodiment, it is made possible to accurately extract patch information also in the case where there is a distortion in the shape of the chart in the chart photographed image. On the other hand, in the case where the patch extraction range reaches the neighboring patch, it is determined that the patch information cannot be acquired correctly and an error message to prompt a user to photograph the chart again is output.

In the present embodiment, the patch extraction range is a square area, but the shape of the patch extraction range is not limited to a square. It may also be possible to set the shape of the patch extraction range to an arbitrary quadrangle, such as a rectangle and a parallelogram, or an arbitrary circle in accordance with the shape of the patch in the chart image or the shape of the patch in the chart photographed image. Even in the case where the shape of the patch extraction range changes, it is only required for the patch extraction determination unit 107 to be capable of determining whether or not the patch extraction range fits inside the patch. Further, in the present embodiment, the case is explained as an example where the patch-to-patch distance between patches neighboring in the transverse direction and the patch-to-patch distance between patches neighboring in the vertical direction are equal, but it is also possible to apply the present invention to the case where these patch-to-patch distances are different.

Second Embodiment

In the first embodiment, the patch extraction range is set for the patch in the chart photographed image. Then, in the case where the patch extraction range reaches the neighboring patch, the patch extraction determination unit 107 determines that the patch information cannot be acquired correctly and the error output unit 108 outputs an error message to prompt a user to photograph the chart again.

However, in the first embodiment, in order to obtain a chart photographed image with no distortion so that the patch extraction range fits inside the patch, a new process to perform photographing again is necessary. Further, the message to be displayed is not limited to that described above (see FIG. 9). It may also be possible to output a message to the effect that the patch extraction range should be set again for the patch of the chart photographed image input to the image processing apparatus, in place of the message to prompt a user to photograph the chart again.

Consequently, in the present embodiment, the case is explained where the patch extraction range setting unit 106 sets the patch extraction range again in accordance with a message other than the message displayed by the error output unit 108 of the first embodiment. In the following explanation of the present embodiment, explanation of the contents in common to those of the first embodiment is simplified or omitted.

(About Configuration of Image Processing Apparatus)

Figure 11:
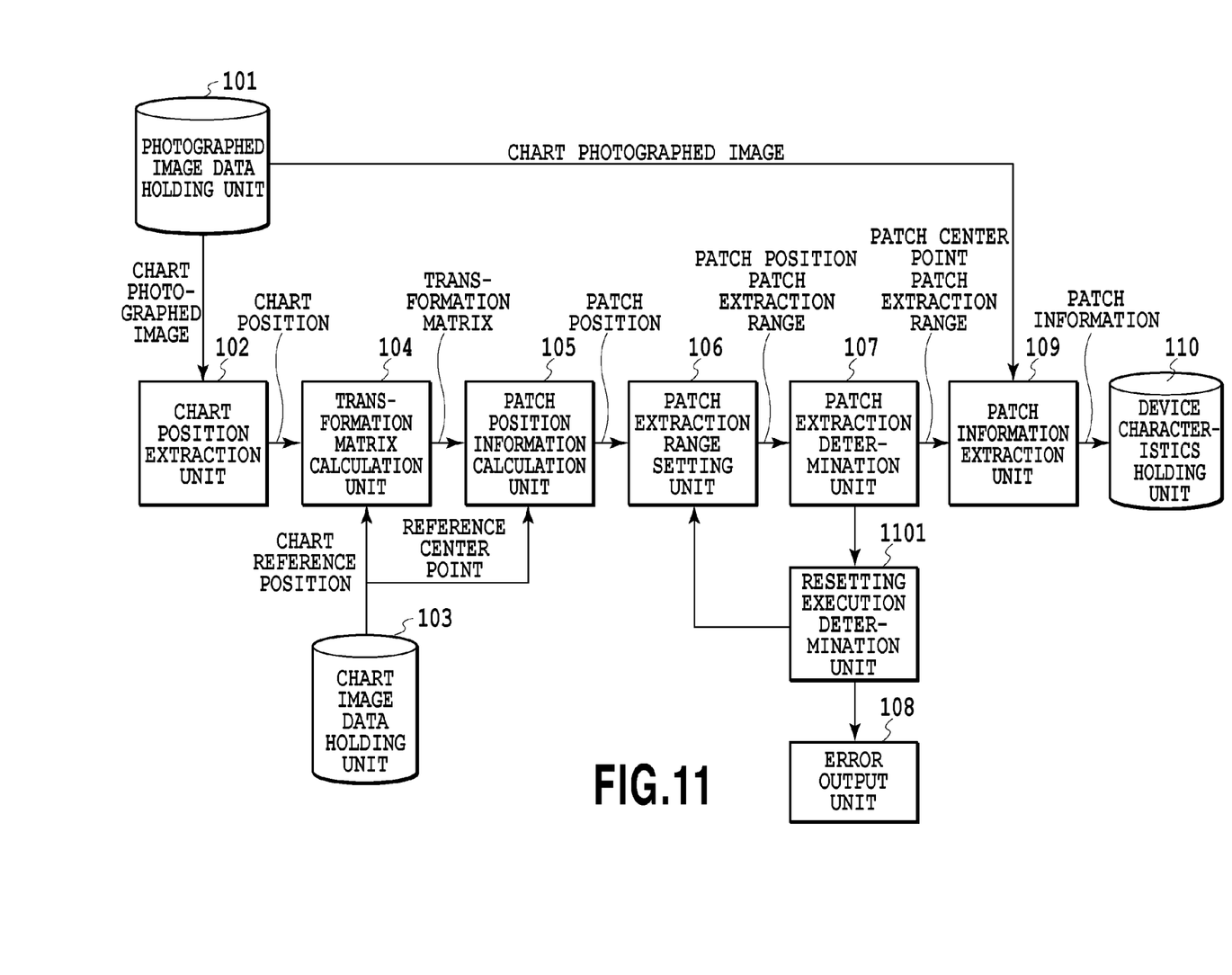
FIG. 11 is a block diagram showing a configuration of an image processing apparatus in a second embodiment.

FIG. 11 is a block diagram showing a function configuration of an image processing apparatus in the present embodiment. The image processing apparatus according to the present embodiment differs from that according to the first embodiment in including a resetting execution determination unit 1101 in the subsequent stage of the patch extraction determination unit 107, which is also the previous stage of the error output unit 108. The resetting execution determination unit 1101 determines whether or not to perform resetting of the patch extraction range in accordance with instructions from a user.

(About Processing Performed by Image Processing Apparatus)

Figure 12:
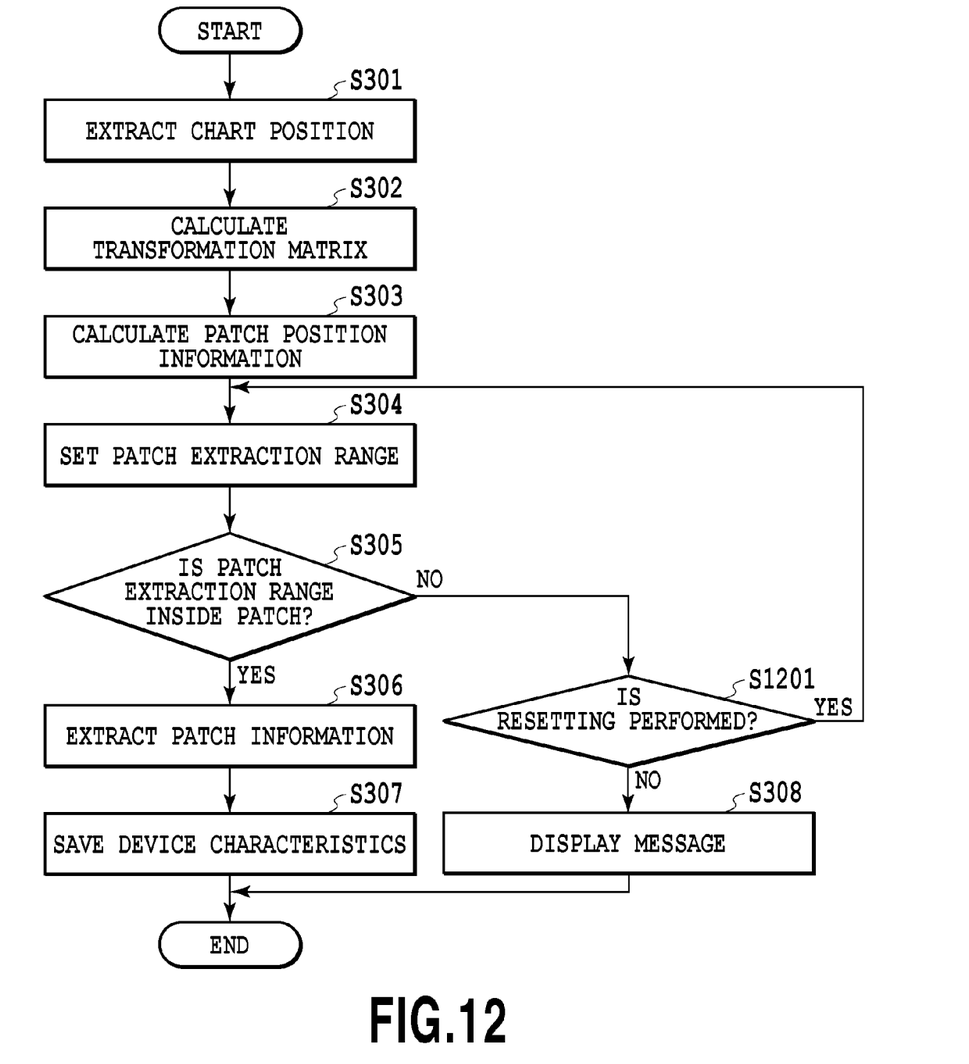
FIG. 12 is a flowchart showing a flow of processing of the second embodiment.

The processing that is performed in the present embodiment is explained by using the flowchart in FIG. 12. However, the same symbol as that in FIG. 3 is attached to the same processing as that of the first embodiment and explanation thereof is omitted.

Figure 13A:
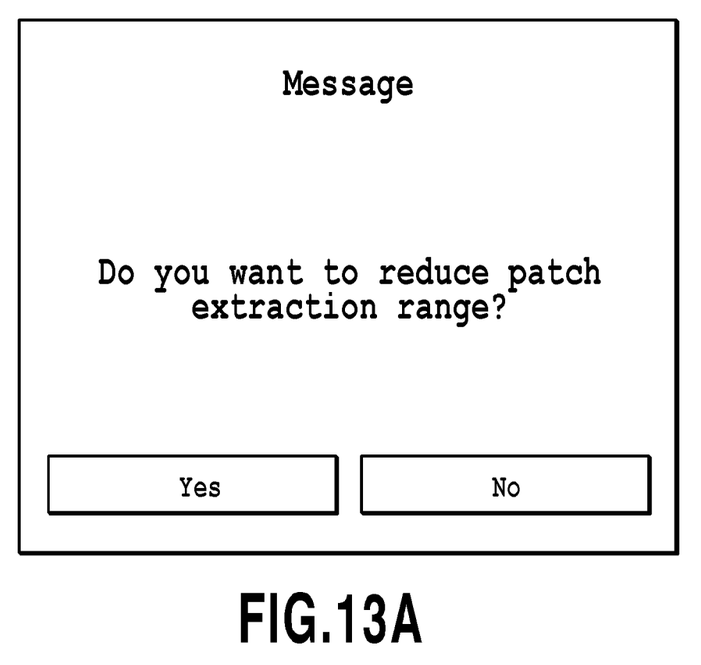
FIG. 13A is a diagram showing an example of a message in the second embodiment.
Figure 13B:
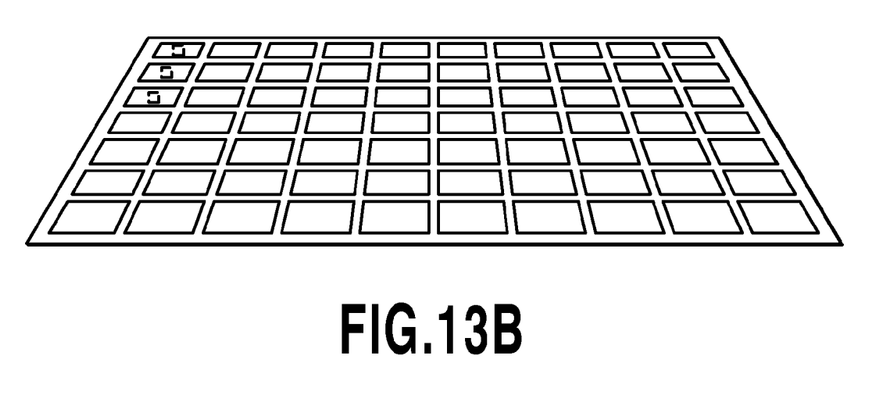
FIG. 13B is a diagram showing an example of a patch extraction range in the second embodiment.

At step 1201, the resetting execution determination unit 1101 displays, for example, a message to ask whether or not to reduce the patch extraction range as shown in FIG. 13A and determines whether or not to perform resetting of the patch extraction range based on the instructions from a user. In the case where the user selects "Yes" in response to this message, the processing returns to S304 and the patch extraction range setting unit 106 performs a setting so as to reduce the patch extraction range. Specifically, as shown in FIG. 13B, the patch extraction range setting unit 106 performs a setting so as to reduce the patch extraction range in accordance with the smallest patch in the chart photographed image. For example, in the first embodiment, the length of one side of the square, which is the shape of the patch extraction range, is set to d, but in the present embodiment, it is sufficient to set the length of one side of the square of the patch extraction range to ½d. In the case where the user selects "No", the processing proceeds to S308 and the message as in FIG. 9 is displayed to prompt the user to photograph the chart again, and the series of the processing is exited.

As above, in the present embodiment, in the case where the patch extraction range does not fit inside the patch, the resetting execution determination unit 1101 outputs a message that prompts resetting of the patch extraction range. Due to the present embodiment, it is possible to extract the patch characteristics using the chart photographed image input to the image processing apparatus as it is by setting a reduced patch extraction range without the need to photograph the patch again.

Figure 14A:
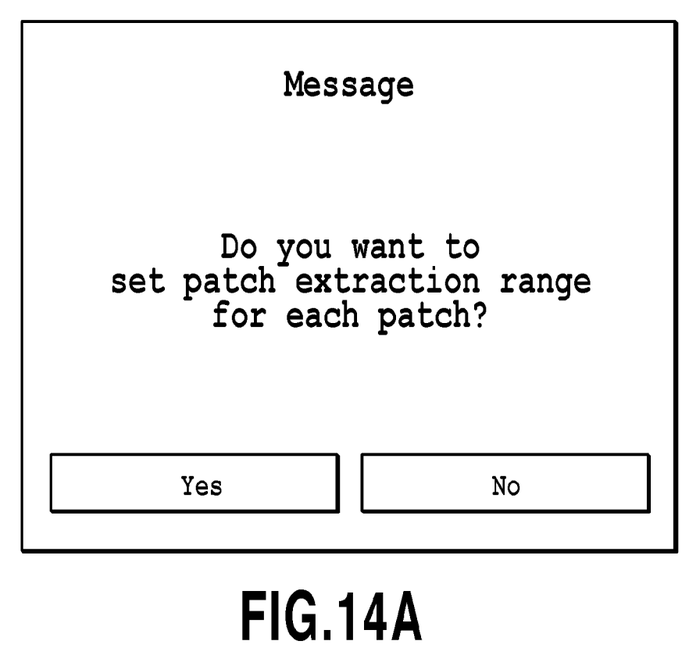
FIG. 14A is a diagram showing an example of a message in the second embodiment.
Figure 14B:
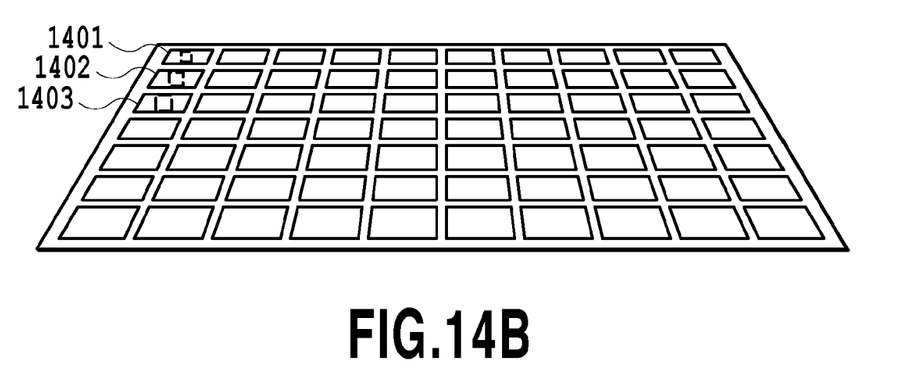
FIG. 14B is a diagram showing an example of a patch extraction range in the second embodiment.

It may also be possible to enable a user select a setting of the patch extraction range for each patch by displaying a message as shown in FIG. 14A. In the case where the user selects "Yes" in response to this message, the processing returns to S304 and the patch extraction range setting unit 106 sets the patch extraction range for each patch. Specifically, the patch extraction range setting unit 106 sets the patch extraction range in accordance with the patch in the chart photographed image as shown in FIG. 14B. For example, for a patch 1401 in FIG. 14B, the length of one side of the square, which is the shape of the patch extraction range, is set to d/2, which is half the length d of one side of the square, which is the shape of the patch extraction range in the first embodiment. Further, for a patch 1402, the length of one side of the square, which is the shape of the patch extraction range, is set to 2d/3. In the case where the user selects "No", the message as shown in FIG. 9 is displayed to prompt the user to photograph the chart again, and the series of the processing is exited.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the above embodiments, it is possible to accurately acquire patch information from a patch image having a distortion at the time of measuring a chart using a digital camera or the like as a measuring instrument.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-110485, filed May 28, 2014, which is hereby incorporated by reference wherein in its entirety.

What is claimed is:

1. An image processing apparatus that extracts colors of patches from a photographed image data of a chart image, the image processing apparatus comprising:
a processor connected to a memory, the processor and memory configured to:
extract information indicating a position of the chart image in the photographed image data;
acquire information indicating a patch position of each patch images in the chart image based on the chart image;
set an extraction range in accordance with the patch position of each of the patch images in the photographed image data based on the information;
determine whether or not the set extraction range fits inside each of the patch images; and
extract a color of each patch image based on pixel values of pixels included in the extraction range in a case where it is determined that the extraction range fits inside each of the patch images for all the patch images.

2. The image processing apparatus according to claim 1, the processor and memory further configured to display an error message in a case where it is determined that the extraction range of a certain patch image does not fit inside the certain patch image.

3. The image processing apparatus according to claim 1, the processor and memory further configured to hold patch information extracted from the photographed image data as a characteristic inherent in a device.

4. The image processing apparatus according to claim 1, wherein
information indicating the position of the chart image is extracted in accordance with instructions from a user via a user interface.

5. The image processing apparatus according to claim 1, the processor and memory further configured to determine whether or not to perform resetting of the extraction range in a case where it is determined that the extraction range of a certain patch image does not fit inside the certain patch image.

6. The image processing apparatus according to claim 5, wherein
the extraction range is reduced in a case where it is determined to perform resetting of the extraction range.

7. The image processing apparatus according to claim 5, wherein
an extraction range is set in accordance with an area size of each patch image in a case where it is determined to perform resetting of the extraction range.

8. An image processing method performed by an image processing apparatus that extracts colors of patches from a photographed image data acquired by photographing a chart image, the method comprising:
extracting information indicating a position of the chart image in the photographed image data;
acquiring information indicating a patch position of each patch images in the chart image based on the chart image;
setting an extraction range in accordance with the patch position of each of the patch images in the photographed image data based on the information;
determining whether or not the set extraction range fits inside each of the patch images; and
extracting a color of each patch image based on pixel values of pixels included in the extraction range in a case where it is determined that the extraction range fits inside each of the patch images for all the patch images.

9. A non-transitory computer readable storage medium storing a program for causing a computer to perform an image processing method that extracts colors of patches from a photographed image data acquired by photographing a chart image, the method comprising:
extracting information indicating a position of the chart image in the photographed image data;
acquiring information indicating a patch position of each patch images in the chart image based on the chart image;
setting an extraction range in accordance with the patch position of each of the patch images in the photographed image data based on the information;
determining whether or not the set extraction range fits inside each of the patch images; and
extracting a color of each patch image based on pixel values of pixels included in the extraction range in a case where it is determined that the extraction range fits inside each of the patch images for all the patch images.

* * * * *